N. P. FRASER.
LOCK.
APPLICATION FILED FEB. 20, 1919.
1,346,815.
Patented July 20, 1920.
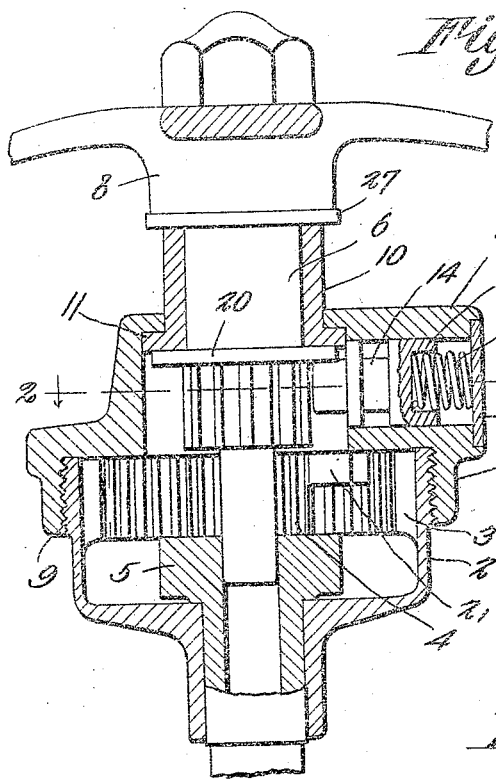
Fig. 1.
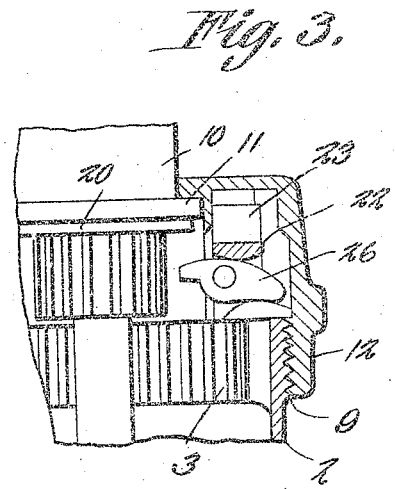
Fig. 3.
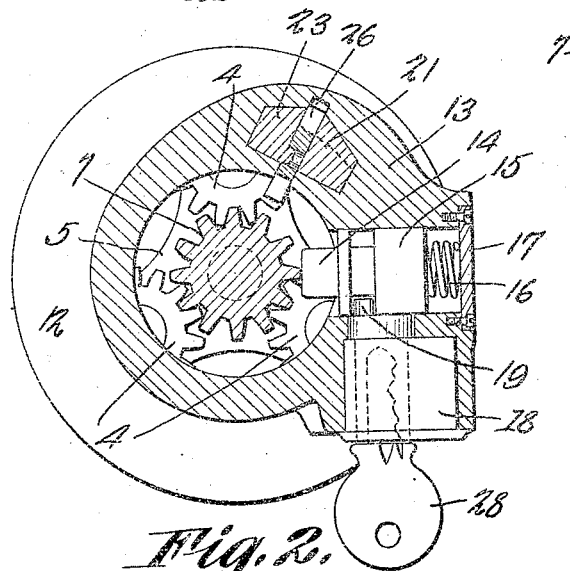
Fig. 2.
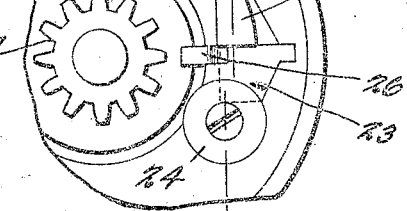
Fig. 4.
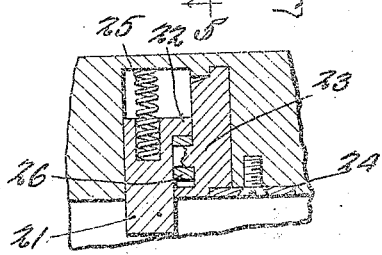
Fig. 5.
Witness
Inventor,
N. P. Fraser
By Chmow &Co.
Attorneys.

UNITED STATES PATENT OFFICE.

NORMAN P. FRASER, OF DETROIT, MICHIGAN.

LOCK.

1,346,815.  Specification of Letters Patent.  Patented July 20, 1920.

Application filed February 20, 1919. Serial No. 278,157.

*To all whom it may concern:*

Be it known that I, NORMAN P. FRASER, a citizen of the United States, residing at Detroit, in the county of Wayne and State of Michigan, have invented a new and useful Lock, of which the following is a specification.

This invention relates to improvements in locks, the object of the invention being to provide a safety device adapted for use in connection with the steering mechanism of an automobile, whereby the latter may be rendered incapable of use by unauthorized persons.

A further object of the invention is to provide a safety lock of this character which is capable of being installed on the steering mechanism of automobiles without any change whatever in the construction of such steering mechanism and which is comparatively simple in construction, inexpensive to manufacture and readily applied by the user of the automobile without the aid of a mechanic.

With these and other objects in view, the invention consists in the novel combination of parts hereinafter more fully described, and pointed out in the claims.

In the drawings accompanying and forming part of this specification,

Figure 1 is a vertical sectional view of the upper portion or head of the steering mechanism of an automobile with the cap removed and my improved safety lock substituted therefor;

Fig. 2 is a cross-sectional view taken on the line 2—2 of Fig. 1, looking in the direction of the arrows in said Fig. 1;

Fig. 3 is a detail sectional view showing the means for operating my improved safety pin;

Fig. 4 is an inverted plan view, broken away, showing the underside of the cap embodying my improved lock; and Fig. 5 is a sectional view taken on line 5—5 of Fig. 4, looking in the direction of the arrows.

The same characters of reference designate the same parts in all the figures of the drawings.

In the embodiment of the invention herein illustrated, 2 designates the usual head carried on the upper end of the steering post of an automobile, said head being provided with internal gear teeth 3 for engagement with the pinions 4 which are rotatably mounted independently of each other at equidistant points on a frame 5 secured to the top of the steering post. The usual shaft 6 is provided carrying a pinion 7 at its lower end for engagement with the pinions 4 and adapted to receive the steering wheel 8 at its upper end, whereby on rotation of the steering wheel such rotation is transmitted through the pinions 7 and 4 to the internal gear teeth 3, thereby rotating the head 2 and the steering post for steering the vehicle.

The head 2 as ordinarily constructed is provided with exterior screw threads as shown at 9, Figs. 1 and 3, for the reception of an interiorly threaded cap having an opening at its center for the passage of the shaft 6. In the present instance the shaft carries a bushing 10 thereon, having at its lower end an annular shoulder 11 to prevent withdrawal of the shaft 6 from the cap or casing member. A collar 27 may also be carried by the shaft above said bushing on which the steering wheel 8 may rest.

My improved locking mechanism is carried by a cap member which is intended to take the place of the cap ordinarily used. The lower portion 12 of this improved cap or casing member is identical in construction with that of the cap in common use and is provided around its interior periphery with screw threads adapted to engage the screw threads 9 of the head 2. The cap or casing 12 is provided with an upward extension 13 eccentrically formed with relation to the cap 12, as shown in Figs. 1 and 2. Within the extension 13 is slidably mounted a plunger 14 having an enlarged head 15 provided with a recess in which is seated one end of a helical spring 16, the other end of said spring abutting against a plate 17 which is secured by any suitable means, such as screws as shown in Fig. 2, within an opening in the side wall of the casing member 13. A lock 18, such as a Yale or other reliable lock, is provided, having a tumbler 19 which is adapted to operate against the head 15 of the plunger thereby to retract it against the tension of the spring 16. In the present improvement the shaft 6 is adapted to slide within the casing member 13, and below the shoulder 11 a washer or collar 20 may be carried by said shaft, as shown in Fig. 1, for coöperation with the plunger 14 for maintaining the shaft in the elevated position shown in said figure, thereby raising the pinion 7 out of mesh with the pinions 4 and rendering the steering wheel useless for steering the vehicle.

For coöperation with the mechanism above described I have provided a safety pin 21, which is adapted, when the shaft is in its elevated position, to drop down or project into the path of the pinions 4, for a purpose to be presently described. This pin 21 is slidably mounted, as shown in Fig. 5, in a recess between the inner and outer walls of the casing 13, being provided at its inner end with an L-shaped projection 22 adapted to abut against a lug 26 that is pivotally carried by a member 23 which is secured in the recess of the casing 13 by means of a disk-shaped plate 24 secured by a screw or any other suitable means to the wall of said casing. The pin 21 is provided at its inner end with a recess in which is seated one end of a helical spring 25, the opposite end of which abuts against the upper wall of the casing 13, whereby the pin 21 is normally held in protracted position. For permitting the retraction of the pin 21, the lug 26 projects through a slot in the inner side wall of the casing 13 and into the path of the washer 20 hereinbefore described, and is provided with a cam-shaped surface on its upper side, as shown in Fig. 3, whereby when the shaft 6 is depressed to bring its pinion 7 into mesh with the pinions 4 the washer or collar 20 will engage the end of the lug 26 and turn said lug on its pivot, whereupon the cam action of said lug will be exerted on the projection 22, thereby retracting the pin 21 against the tension of its spring. The shoulder 11 of the bushing 10 and the washer or collar 20 on the shaft 6 remain in contact with the outer end of the pivoted lug 26 and so hold the pin 21 withdrawn or retracted as long as the shaft is in its pinion-engaging position.

The operation of the device is as follows: The ordinary cap is first removed from the steering head of the machine. The short shaft 6 of my improved safety lock is then pushed down to its lowermost position in the casing so that its pinion 7 is in position to engage the pinions 4 when the cap is screwed on the steering head. This action has caused the engagement of the collar 20 and shoulder 11 with the projecting end of the lug 26 and thereby retracted the safety pin 21 within the casing so as to permit rotation of the cap for screwing it on to the steering head. The key 28 is then turned so as to project the plunger 14 in contact with the upper surface of the shoulder 11, thereby preventing the shaft from sliding upwardly. The cap or casing is then screwed on the head of the steering post and the wheel 8 secured on the upper end of the shaft 6. The steering mechanism is now ready to be operated in the usual manner.

When it is desired to render the steering mechanism inoperative and to lock it against being tampered with by unauthorized persons, the key is turned so as to retract the plunger 14 against the tension of its spring thereby to permit the shaft 6 to be raised to the position shown in Fig. 1, with its pinion 7 out of engagement with the pinions 4. During this upward movement of the shaft the shoulder 11 and collar 20 have passed out of contact with the end of the lug 26 and this lug has been turned on its pivot by the tension of the spring 25 seated in the end of the safety pin 21, the projecting portion 22 of said pin acting on the cam surface of the lug 26 to force the inner end of the lug downward. The key 28 is then turned so as to project the plunger into contact with the under face of the collar 20 on the shaft 6, as shown in Fig. 1. In this condition the steering wheel may be freely rotated without having any effect whatever on the steering mechanism, and the safety pin 21 has been projected downwardly, as shown in Fig. 5, so that it will project within the lower part 12 of the casing or cap member and into the path of the pinions 4, thus rendering it impossible to rotate the cap for the purpose of removing it.

While I have described somewhat minutely the details of construction of the embodiment of the invention herein shown, I do not desire to limit myself to the identical construction illustrated, as the specific details of construction may be considerably changed without departing from the spirit and scope of my invention as set forth in the appended claims.

I claim as my invention:

1. The combination with the steering head of an automobile provided with pinions for operating the steering mechanism, of a removable cap member adapted to be attached to said head, a shaft slidable within said member and carrying a pinion adapted to be slid into and out of engagement with said operating pinions, a collar carried by said shaft, a spring-actuated plunger within the cap member and adapted to be projected into the path of said collar for locking said shaft against sliding movement, a lug pivoted within the cap member and having a cam surface projecting into the path of said collar, and a spring pressed pin slidable within the cap member and adapted to be projected into the path of said operating pinions when said collar has passed out of engagement with the cam surface of said lug.

2. The combination with the steering head of an automobile provided with pinions for operating the steering mechanism, of a removable cap member adapted to be attached to said head, a shaft slidable within said member and carrying a pinion adapted to be slid into and out of engagement with said operating pinions, a collar carried by said shaft, a spring-pressed plunger within the cap member and adapted to be projected into the path of said collar for locking said shaft against sliding movement, a lug pivoted within the cap member and adapted to be engaged by said collar when the shaft is slid in one direction and to be disengaged by said collar when the shaft is slid in the opposite direction, and a spring-pressed pin slidable within said cap member and adapted to coact with said pivoted lug whereby when the lug is in engagement with the collar the pin is retracted within the cap member and when the lug is out of engagement with the collar the pin is projected into the path of the operating pinions.

In testimony that I claim the foregoing as my own, I have hereto affixed my signature in the presence of two witnesses.

NORMAN P. FRASER.

Witnesses:
 GEO. H. KEYES,
 STANLEY M. KEYES.